July 22, 1969
H. M. TURNER
3,457,337
METHOD FOR PRODUCING COATED CONTAINERS
Original Filed April 1, 1964
2 Sheets-Sheet 1
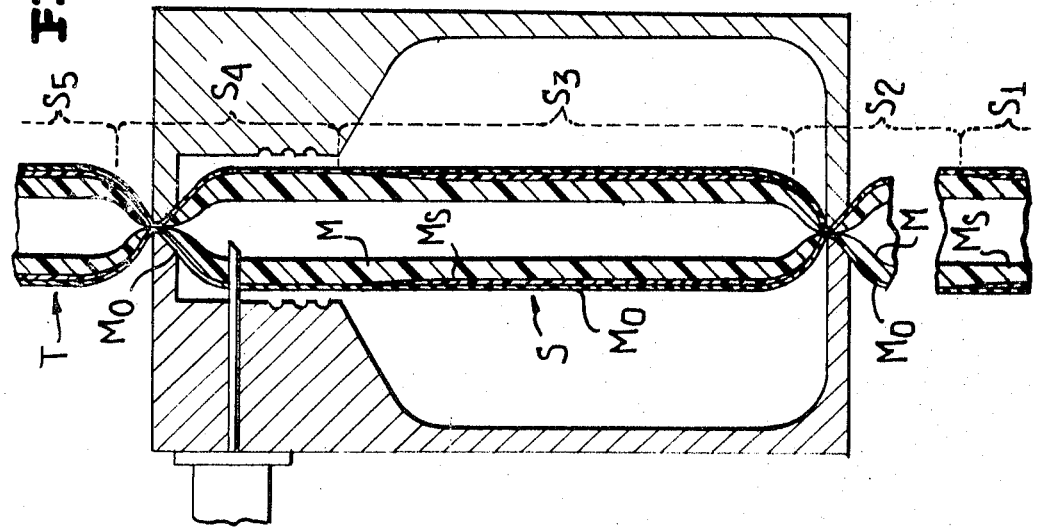
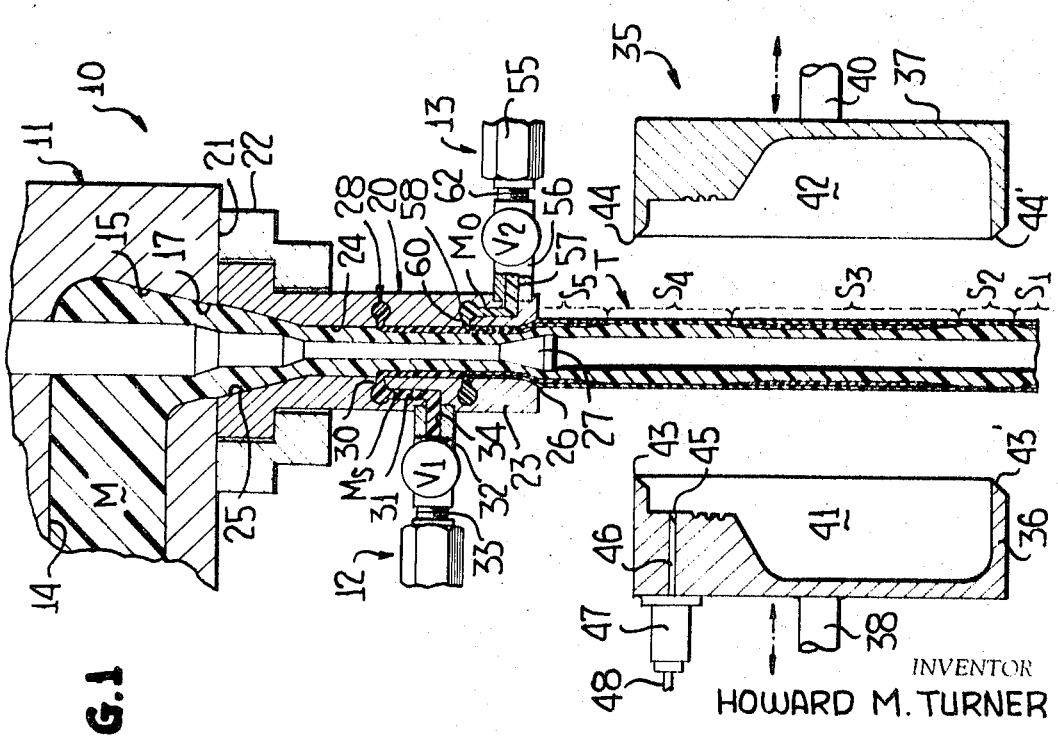
INVENTOR
HOWARD M. TURNER
BY
Mason, Porter, Diller & Brown
ATTORNEYS July 22, 1969  H. M. TURNER  3,457,337
METHOD FOR PRODUCING COATED CONTAINERS
Original Filed April 1, 1964  2 Sheets-Sheet 2

INVENTOR
HOWARD M. TURNER

BY Mason, Porter, Diller & Brown
ATTORNEYS

United States Patent Office 3,457,337
Patented July 22, 1969

3,457,337
METHOD FOR PRODUCING COATED
CONTAINERS
Howard M. Turner, Oak Forest, Ill., assignor to Continental Can Company, Inc., New York, N.Y., a corporation of New York
Original application Apr. 1, 1964, Ser. No. 356,411. Divided and this application June 23, 1967, Ser. No. 648,356
Int. Cl. B29d 23/03; B32b 1/08
U.S. Cl. 264—98                   10 Claims

ABSTRACT OF THE DISCLOSURE

This invention relates to a novel method of forming multi-ply plastic containers by extruding a composite plastic tube composed of at least two tubular laminates one of which is axially shorter than the other. A section of the tube is pinched-off across an unlaminated portion thereof and the section is then pneumatically expanded to the desired configuration preferably by introducing into the clamped-off section a pressurized medium through a blow needle entering the section through the unlaminated portion of the tube. This assures excellent adhesion of the pinched-off section at the pinched-off areas and also prevents delamination of the finally formed article. In accordance with another aspect of this invention three or more laminates are extruded and pinched-off in such a manner that a container blow-molded therefrom includes a body having at least one more laminate than the container neck.

This application is a divisional application of my co-pending, commonly assigned application entitled Method and Apparatus for Producing Coated Containers filed Apr. 1, 1964, Ser. No. 356,411, now abandoned.

Heretofore plastic articles and particularly plastic containers have been exteriorly and/or interiorly coated by conventional methods, such as dip coating or spray coating. The judicious application of such coatings improves the functionality of the containers insofar as the ability of such coated containers to hold certain products. For example, a polyethylene container dip coated with a 0.3–0.4 mil thick coating of vinylidene chloride (Saran) exhibits a five-fold reduction in oxygen permeation over an uncoated bottle. This permits the packaging of products, such as salad oils and other products similarly sensitive to oxygen permeation into containers so coated. Recently it has become common to form multi-ply containers by extruding a plural-laminate tube and conventionally pneumatically expanding the tube to a desired container configuration. This process is somewhat more advantageous than dip coating or spray coating because additional equipment, labor, over-spraying or over-coating, etc., is unnecessary. However, in all of these methods of production a prime disadvantage is the difficulty of maintaining high product quality on a production basis because of the inability to achieve adhesion between the "base containers" and the coatings applied thereto, whether by spraying, dipping, multiple-ply extruding, etc. As a result the base container and its coatings tend to delaminate which is particularly true if the outermost ply of the container is relatively thin and includes closure-securing means, such as lugs, screw threads, etc. In the latter example a closure which is inadvertently or accidentally over-tightened upon conventionally produced laminated containers tends to tear the outer ply from the next succeeding ply thereby rendering such containers wholly inoperative.

The novel process of this invention substantially overcomes the disadvantages of spray coating, dip coating, multi-ply extrusion and similar methods. The process is carried out by an apparatus which includes a primary and one or more secondary extrusion systems. The primary extrusions system includes an extrusion die having a bore through which a base plastic material, such as polyethylene, is advanced in the form of a tube. The secondary extrusion system (or systems) is connected to the extrusion die of the primary extrusion system by conduit means and another plastic material, such as polyvinylchloride, polystyrene, chloronated polyethylene, nylon or similar plastic materials, is then directly applied against the exterior of the base tube whereby intimate lamination is achieved between the base tube and the coating prior to the laminated or composite tube being completely extruded through the bore. More important is the fact that the application of the coating material is terminated in such a manner that a section of the tube is pinched-off across an unlaminated tube portion. The advantage of this procedure is the excellent adhesion achieved at the pinched-off portion of the tube because of the identical material involved during the pinching-off operation. Furthermore, when the "coating" material of the secondary system is gradually terminated the tubular laminate progressively merges in a tapering fashion with the base material and a container molded therefrom is highly resistive to delamination. When such a container is provided with a neck having screw threads, lugs or similar closure fastening means the uniform single-ply thickness of the neck formed by the base material also avoids delamination caused by over-tightening as was heretofore noted.

In keeping with the above it is also an object of this invention to provide a novel method of molding a multi-ply container which includes at least one less laminate at a neck thereof as opposed to the container body. In accordance with this method a composite tube is first extruded which is composed of at least three tubular laminates of which the medial laminate is shorter than the remaining laminates. This is accomplished by slowly closing a valve of one of the secondary extrusion systems such that a section of the tube which is to be pinched-off is composed of all three laminates while a remaining portion is composed of only the inner and outer laminates. The pinching-off takes place across the remaining laminates which are preferably formed of identical plastic material, and thereafter the pinched-off section is expanded to form a container having a body of a three-ply (or more) construction and a neck having at least one-ply less. The advantages of this method of producing containers corresponds to those heretofore noted, but another additional advantage is the complete sandwiching of the medial laminate between the inner and outer laminates of identical material which virtually precludes delamination of the container during its lifetime.

In accordance with both methods heretofore described it is a further object of this invention to pinch-off each tube at axially opposite end portions thereof between conventional mold bodies and to so control the composite tube that the pinching-off occurs not only in the neck area of the finally formed container but also at the area of the bottom wall. Thus, the advantages associated with the pinch-off at the neck are equally characteristic of the pinched-off area of the bottom wall.

With the above noted objects in view that will hereinafter appear, the nature of the invention will be more clearly understood by reference to the following detailed description, the appended claims and the several views illustrated in the accompanying drawings:

In the drawings:

FIGURE 1 is a fragmentary vertical sectional view of an apparatus for the practice of the novel method of this invention, and illustrates a multi-ply plastic tube being extruded toward an open blow-mold.

FIGURE 2 is a highly enlarged sectional view of the blow-mold of FIGURE 1 after the latter has been closed to pinch-off a section of the composite tube and clearly illustrates the shorter axial length of a medial tubular laminate as compared to remaining laminates of the composite tube.

Figure 3:
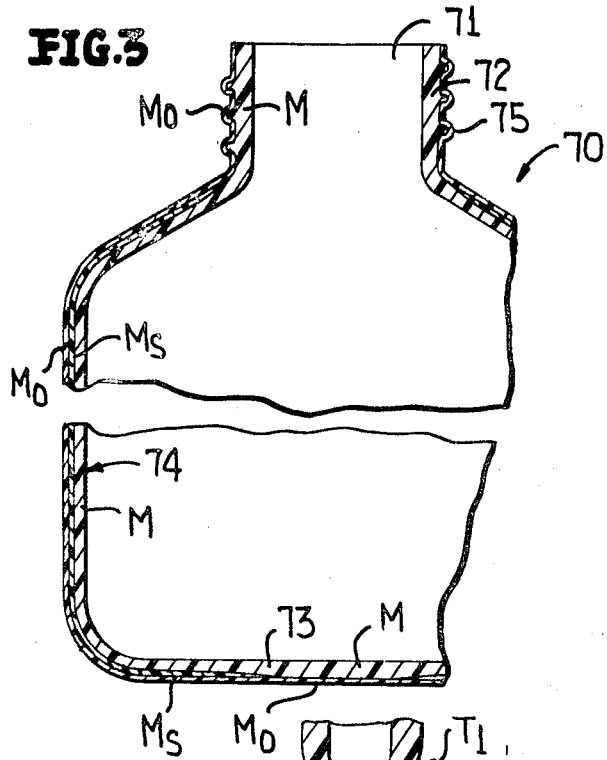
FIGURE 3 is a fragmentary sectional view of a container formed by the expansion of the composite tube of FIGURE 2, and illustrates the particular laminar construction thereof.

An apparatus constructed for the practice of the novel method of this invention is that illustrated in FIGURE 1 of the drawings, and is generally designated by the reference numeral 10. The apparatus 10 comprises an extrusion system (unnumbered) including a primary extruder head 11 forming a part of a conventional extrusion machine (not shown) and a pair of secondary extruder heads 12, 13 similarly forming portions of two unillustrated conventional extrusion machines.

The primary extruder head 11 includes a chamber 14 terminating in a downwardly converging chamber portion 15. A cylindrical opening 17 of the primary extrusion head 11 is in axial alignment with the downwardly converging chamber portion 15 of the chamber 14. A mandrel 18 is mounted for reciprocal movement in the cylindrical bore or opening 17 and projects downwardly through the converging chamber portion 15 in the manner clearly illustrated in FIGURE 1.

An extrusion die 20 is secured to a face 21 of the extruder head 11 by a conventional fastening collar 22. A plurality of bolts (not shown) pass through the collar 22 and are threadably received in threaded openings (also not shown) in the body of the primary extrusion head 11 in a well known manner.

The extrusion die 20 includes a die body 23 disposed in a generally vertical plane. The die body 23 is substantially cylindrical and has a bore 24 in axial alignment with the cylindrical opening 17 and the converging chamber portion 15. An upwardly diverging bore portion 25 joins the bore 24 of the die body 23 with the converging chamber portion 15 of the primary extruder head 11. A generally annular extrusion orifice 26 is set-off by a bottom portion of the bore 24 and a conical end 27 of the mandrel 18. The extrusion orifice 26 is varied in size by moving the mandrel 18 in a well known manner thereby regulating the wall thickness of a coated or composite tube extruded through the extrusion die 20 in a manner to be described fully hereafter.

An annular chamber 28 which is substantially circular in cross-section is formed in the body 23 of the extrusion die 20. The annular chamber 28 opens radially inwardly into the bore 24 through an interior surface thereof by an annular orifice 30. The annular orifice 30 is defined by opposing surfaces converging radially inwardly toward the axis of the bore 24. A channel or port 31 is in fluid communication with the annular chamber 30 and extends substantially parallel to the bore 24. A connecting nipple 32 is welded to the body 23 of the extrusion die 20 and is threadably connected at 33 to the secondary extruder head 12. The nipple 32 includes a bore 34 and a regulating valve $V_1$ which may be manually or automatically adjusted to reduce and/or cut-off fluid communication with a conventional chamber (not shown) of the second extruder head 12. Thus, by regulating the valve $V_1$ the flow of material through the bore 34 can be increased, decreased or completely terminated for a reason to be described more fully hereafter.

A sectional blow-mold 35 composed of a pair of blow-mold bodies 36 and 37 is supported in a conventional manner beneath the extrusion die 20 and in axial alignment with the bore 24 thereof. Identical rods 38 and 40 are connected to the respective mold bodies 36 and 37 for moving the mold bodies between the open position shown in FIGURE 1 and the closed position shown in FIGURE 2 as indicated by the double-headed directional arrows in FIGURE 1. A mold cavity 41 is formed in the mold body 36 while a complementary mold cavity 42 is formed in the mold 37. The cavities 41 and 42 are contoured to the general configuration of the container which is to be blow-molded in the mold 35.

Opposing faces 43 and 44 of the respective mold bodies 36 and 37 clamp-off or pinch-off and weld the material of the plastic tube extruded through the extrusion die 20 when the mold bodies 36 and 37 are in the closed position thereof (FIGURE 2). Similar opposing faces 43' and 44' pinch-off and weld the material of the tube at a point axially downwardly spaced from the pinch-off effected by the faces 43, 44.

The mold body 37 has a substantially radial bore 45 in which is movably mounted a blow needle 46. The blow needle 46 forms a part of a conventional blow needle mechanism 47 secured to the mold body 37. A conduit 48 places the interior of the blow needle mechanism 47 in fluid communication with a source of pressurized gas, such as air. When the mold bodies 36 and 37 are open, as shown in FIGURE 1, the blow needle 46 is housed completely in the radial bore 45. However, in the closed position of the mold bodies 36 and 37 a piston (not shown) secured to the blow needle 46 is actuated by the source of pressurized gas to move the blow needle 46 out of the radial bore 45 to the position shown in FIGURE 2 at which time air is introduced through an orifice (not shown) in the blow needle 46 into the interior of the pinched-off section of the composite or laminated tube in a manner to be described more fully hereafter to urge the pinched-off section of the tube to the general configuration of the mold cavities 41 and 42.

In accordance with this invention and in keeping with the structure thus far described a two-ply composite tube and a two-ply container can be formed in a manner which will be described hereafter. However, it is also possible to form three-ply (or more) containers and to this end the extruder head 13 is provided. The extruder head 13 is substantially identical to the extruder head 12 and is coupled to the extrusion die 20 by a nipple 56 having a bore 57. The bore 57 is in fluid communication with a port or channel 58 formed in the body 23 of the extruxion die 20 in substantial parallelism to the bore 24. The port 58 opens into an annular chamber 60 which, for purposes of this invention is substantially identical to the annular chamber 60 opens radially inwardly into the bore 24 by means of an annular orifice 61 having opposing walls converging radially inwardly. The extruder head 58 is shown threadably connected at 62 to the nipple 56, and also includes a conventional valve mechanism $V_2$ interposed between the second extruder head 55 and the nipple 56 for functioning to increase, decrease and/or terminate the flow of the material from the extruder head 55.

The practice of the invention is initiated by filling the conventional extrusion machines (not shown) of the extrusion heads 11, 12 and 13 with plastic material which is plasticized and advanced by the respective regulation of an extrusion crew and/or valve (not shown) associated with the chamber 14 and the adjustment of the valves $V_1$ and $V_2$. Plastic material M in the chamber 14 of the primary extruder head 11 is a base polymer, such as polyethylene or polystyrene, and for the purpose of this description it will be assumed that the material M is polyethylene. Plastic material Ms in the chamber (not shown) of the extruder head 12 is one of a variety of thermoplastic polymers, such as polystyrene, polyvinylchloride, expanded polystyrene, nylon, polyesterterepthalate, polyvinyldichloride, chloronated polyethylene, vinylidene chloride, etc. For the purpose of this description, it will be hereinafter assumed that the material Ms in the chamber of the extruder head 12 is vinylidene chloride (Saran). Plastic material Mo, which may be identical to the plastic material M or the plastic material Ms is associated with the extruder head 12 and the plastic material Mo will be hereinafter considered to be polyethylene.

Assuming that the extruder heads 11 through 13 are each forcing the respective plastic materials M, Ms and Mo into the bore 24 a composite tube T is initially extruded through the orifice 20. Since all three extrusion heads 11 through 13 are operative a down-stream-most section $S_1$ (FIGURE 2) of the composite tube T is of a three-ply tubular construction defined by an innermost laminate (unnumbered) formed by the material M, a medial tubular laminate (also unnumbered) formed by the material Ms and an outermost tubular laminate (also unnumbered) formed by the material Mo. The valve $V_1$ is then progressively closed which causes the gradual discontinuation of the application of the material Ms upon the exterior surface of the material M which results in a gradual upwardly converging termination of the tubular laminate of the material Ms in the section $S_1$, in the manner clearly illustrated in FIGURE 2 of the drawings.

A section $S_2$ following the section $S_1$ is therefore composed solely of the material M and Mo because of the termination of the flow of the material Ms.

The valve $V_1$ of the extruder head 12 is thereafter progressively opened to again apply the material Ms against the exterior of the material M which results in the initial formation of a section $S_3$ of the tube T in which the tubular laminate of the material Ms progressively diverges in cross-section in an upward direction as viewed in FIGURES 1 and 2 of the drawings. The valve $V_1$ is thereafter progressively closed to terminate the application of the material Ms at a point below the portion of the blow-mold which will eventually form the neck of the container, as shown in FIGURE 2 of the drawings. At the termination of the flow of the material Ms only the material Mo is directly extruded upon the exterior surface of the material M resulting in a two-ply section $S_4$. Thereafter the valve $V_1$ is again progressively opened to form a section $S_5$ from the materials M, Ms and Mo.

After the sections $S_1$ through $S_4$ of the laminated tube T have been extruded in the manner just described, the bodies 36, 37 of the blow-mold 35 are closed by the movement of the rods 38, 40 toward each other causing the pinching-off or clamping-off of a section S of the tube T. The clamping-off takes place across the two-ply tubular laminate section $S_4$ between the faces 43, 44 and the two-ply tubular laminate section $S_2$ by the faces 43', 44', as clearly shown in FIGURE 2 of the drawings. The pinched-off section S is therefore defined generally by the entire three-ply tubular laminate section $S_3$ and $S_4$ in the interior of the blow-mold. The pinching-off fuses or welds the plastic material at axially opposite end portions of the pinched-off section S prior to the puncturing of the pinched-off section S by the blow needle 46.

The blow needle 46 of the blow needle mechanism 47 is advanced from the position shown in FIGURE 1 to the position shown in FIGURE 2 causing the puncture of the section $S_4$ and the material M and Mo thereof. Pressurized air from a conventional source is supplied through the conduit 48, the blow needle mechanism 47 and the orifice (not shown) of the blow needle 46 into the interior of the pinched-off section S forcing the latter to the general configuration of the mold cavities 41, 42 thereby forming a blown coated plastic container which is generally designated by the reference numeral 70. The container 70 is subsequently removed from the cavities 41 and 42 by the movement of the rods 38 and 40 and the respective mold bodies 36, 37 to the positions shown in FIGURE 1.

After the container 70 has been suitably trimmed (FIGURE 3) a desired product can be packaged through an opening 71 of the container neck 72 in a conventional manner, after which the container is closed by securing a conventional closure (not shown) thereto. The container 70 further includes a base or bottom wall 73 and a body wall 74 which is substantially cylindrically shaped and terminates at the neck 72 which is preferably provided with closure fastening means 75 in the form of screw threads, lugs or similar means depending, of course, upon the particular configuration of the mold cavities 41, 42. Due to the particular manner of forming the container 70 just described it should be noted that the neck 72 thereof is constructed as a two-ply laminate (M and Mo) of the same material which in accordance with the example is polyethylene. The container body 74 is, however, of a three-ply tubular laminate consisting of the outer tubular laminate formed by the material Mo, the medial tubular laminate composed of the material Ms and an innermost laminate formed by the material M.

The laminate formed by the material Ms terminates just short of the neck 72 at the upper end portion of the container and radially inwardly from the axis of the container in the area of the bottom wall 73. The bottom wall 73 is therefore formed at its centermost pinched-off portion by the material M and Mo while an outermost annular portion (unnumbered) of the bottom wall 73 is formed by all of the plastic laminates M, Ms and Mo.

It should be particularly noted that the tubular laminate formed by the material Ms is wholly sandwiched between the tubular laminates formed by the material M and Mo both in the area adjacent the neck 72 and at the bottom wall 73. Furthermore, since the material M and Mo is identical or if not identical has excellent adhesion characteristics delamination of the container 70 is virtually precluded and product protection and/or container rigidity is retained because of the major three-ply construction of the container. In this manner the neck 72 is composed of solid polyethylene which facilitates the pinching-off and welding of the material heretofore noted and prevents delamination upon the over-tightening of a closure applied to the neck 72. While this is a preferred combination of plastic materials from which the container 70 is constructed, various other combinations of plastic material may be employed to achieve other benefits. For example, the innermost tubular laminate Ms (which is discontinuous) may be formed from expanded polystyrene, as opposed to polyvinylchloride, to obtain greater wall thickness per unit weight and to achieve increased insulation of the container.

Figure 5:
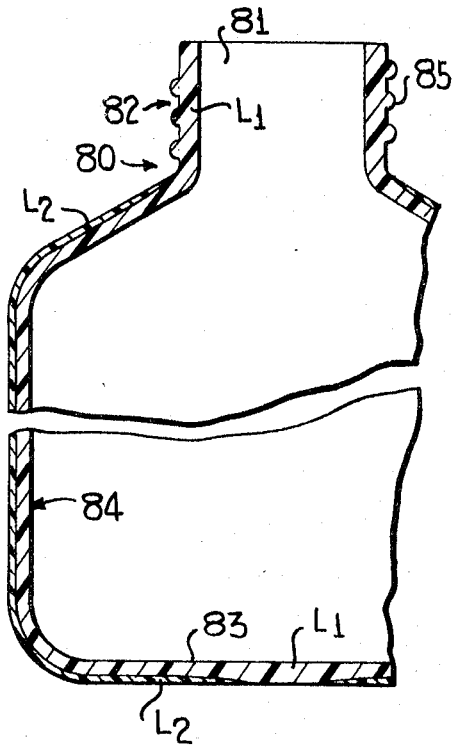
FIGURE 5 is a fragmentary sectional view of a container constructed from the composite tube of FIGURE 4, and illustrates the particular laminar construction thereof.
Figure 4:
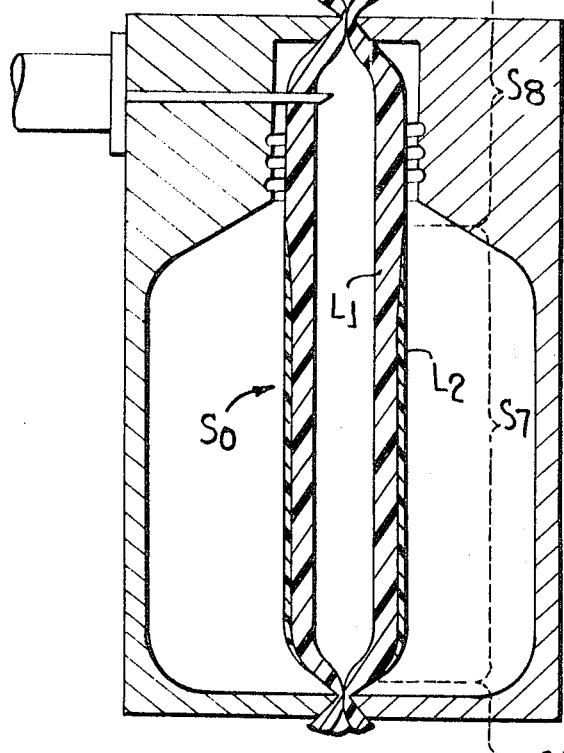
FIGURE 4 is a sectional view similar to FIGURE 2, and illustrates the practice of the method in conjunction with a two-ply composite tube.

Reference is now made to FIGURE 4 of the drawings which illustrates another composite tube $T_1$ having a pinched-off section So which is in turn defined by sections $S_6$, $S_7$ and $S_8$. As opposed to the composite tube T, the composite tube $T_1$ is constructed of a maximum of two tubular laminates $L_1$, $L_2$. The laminate $L_1$ is formed from the material being extruded by the extruder head 11 while the laminate $L_2$ is formed from the material extruded by the extruder head 12 or the extruder head 13 depending, of course, upon which of the valves $V_1$ or $V_2$ is completely closed at all times during the extrusion of the tube $T_1$. Assuming that the extrusion head 13 is closed the valve $V_1$ of the extrusion head 12 is manipulated in much the same manner as that heretofore described relative to FIGURE 2 to form the sections $S_6$ through $S_8$ of the tube $T_1$ which are subsequently clamped-off in the manner clearly illustrated in FIGURE 4 and subsequently blow-molded in the manner heretofore described relative to FIGURE 2 to form the container 80 of FIGURE 5.

It will be noted that the container 80 similarly includes a neck 82 of a one-ply construction defining a mouth 81 through which a product may be dispensed from a body 84 which is generally of a two-ply construction defined by the laminates $L_1$ and $L_2$. The laminate $L_2$ terminates adjacent but short of the neck 82 and likewise terminates adjacent but short of the axis of the container at a bottom wall 83 thereof. Delamination of the container 80 is similarly precluded because of the absences of multi-ply portions in the area of the neck 82 which would tend to delaminate upon the forceful application of a closure upon the lugs or similar closure securing means 85. The gradual tapering configuration of the tubular laminate $L_2$ upwardly toward the neck and inwardly toward the axis of the bottom wall also virtually precludes delamination as might occur if the laminate $L_2$ were abruptly terminated during the extrusion of the tube $T_1$.

I claim:

1. A method of molding a multi-ply article comprising the steps of extruding a composite plastic tube composed of at least two tubular laminates one of which is axially shorter than the other, pinching-off a section of the tube across an unlaminated portion thereof, and expanding the pinched-off section to a desired configuration whereby the completed article is formed of both laminated unlaminated portions.

2. The method as defined in claim 1 wherein the pinched-off section is expanded by introducing therein a pressurized medium through a puncture in the unlaminated portion of the tube.

3. The method as defined in claim 1 wherein the pinched-off section of the tube includes another unlaminated portion and the pinching-off takes place across both unlaminated portions whereby opposite end portions of the completed article are unlaminated while a medial portion is of a laminated construction.

4. The method as defined in claim 1 wherein the completed article is a container having a neck portion defined by the unlaminated portion of the pinched-off section.

5. A method of molding a multi-ply article comprising the steps of extruding a composite plastic tube composed of at least two tubular laminates one of which is axially shorter than the other, pinching-off a section of the tube, and expanding the pinched-off section to a desired configuration by introducing a pressurized medium through a puncture in the unlaminated portion of the tube.

6. A method of molding a multi-ply article comprising the steps of extruding a composite plastic tube composed of at least three tubular laminates of which the medial laminate is shorter than the remaining laminates, pinching-off a section of the tube across a portion of the remaining laminates, and expanding the pinched-off section to a desired configuration whereby the completed article is formed of both two-ply and three-ply portions.

7. The method as defined in claim 6 wherein both remaining laminates are formed from the same material.

8. The method as defined in claim 6 wherein the pinched-off section is expanded by introducing therein a pressurized medium through a puncture in the remaining laminate of the tube.

9. The method as defined in claim 8 wherein the completed article is a container having a neck portion defined by the remaining laminates and a body portion defined by all three laminates.

10. A method of molding a multi-ply article comprising the steps of extruding a composite plastic tube composed of at least three tubular laminates of which the medial laminate is shorter than the remaining laminates, pinching-off a section of the tube, and expanding the pinched-off section to a desired configuration by introducing a presurized medium through a puncture in the remaining laminates.

References Cited

UNITED STATES PATENTS

| | | | |
|---|---|---|---|
| 2,579,390 | 12/1951 | Mills | 264—99 |
| 2,781,551 | 2/1957 | Richerod | 264—98 X |
| 2,936,489 | 5/1960 | Sherman | 264—97 |
| 3,023,461 | 3/1962 | Sherman | 264—98 |
| 3,198,861 | 8/1965 | Marvel | 264—98 |
| 3,223,761 | 12/1965 | Raley | 264—95 |
| 3,257,482 | 6/1966 | Schechter | 264—98 X |

ROBERT F. WHITE, Primary Examiner

T. J. CARVIS, Assistant Examiner

U.S. Cl. X.R.

18—5; 264—173